Patented Aug. 7, 1951

2,563,133

UNITED STATES PATENT OFFICE

2,563,133

REACTION OF POLYCARBOXYLIC ACIDS AND POLYTHIOLS

Joseph C. Patrick, Morrisville, Pa., and Harry B. Ferguson, Trenton, N. J., assignors to Thiokol Corporation, Trenton, N. J., a corporation of Delaware No Drawing. Application November 7, 1944, Serial No. 562,395

1 Claim. (Cl. 260—78.4)

This invention relates to polymeric substances containing sulfur in chemical combination.

It is an object of the invention to provide new polymers and new polymeric processes or techniques.

In accordance with the present invention polybasic acids in general are reacted with polymercapto bodies; that is, organic compounds containing 2 or more mercapto groups, said compounds being therefore polyfunctional in respect of said mercapto groups, are reacted with polybasic acids to produce polymers, which may be characterized as polythio esters. Moreover, copolymeric esters of this nature are in accordance with the invention obtained by reacting a mixture of a polymercapto body and a polyhydric alcohol with polybasic acids. Such copolymers may also be obtained by first reacting the polymercapto compounds with the polybasic acid, and separately reacting a polyhydric alcohol with a polybasic acid and then reacting the polyesters thus separately produced to obtain said copolymer products.

Various examples of the genus or class designated as polymercapto compounds and employed in accordance with the present invention are shown in the following table.

TABLE I $HSC_2H_4SH$ $HSC_nH_{2n}SH$ where $n$ may vary from 2 to 20 or more.

$HSCH_2CHCH_2SH$
$\quad\quad\quad |$
$\quad\quad\quad S$
$\quad\quad\quad |$
$\quad\quad\quad H$ $C_nH_{2n-1}(SH)_3$ $HSCH_2CH_2—CH—CH_2CH_2SH$
$\quad\quad\quad\quad\quad\quad |$
$\quad\quad\quad\quad\quad\quad CH_2$
$\quad\quad\quad\quad\quad\quad |$
$\quad\quad\quad\quad\quad\quad SH$ $C_nH_{2n-3}(SH)_4$ $HSCH_2CH_2CHCH_2CHCH_2SH$
$\quad\quad\quad\quad\quad CH_2\quad CH_2$
$\quad\quad\quad\quad\quad |\quad\quad\ |$
$\quad\quad\quad\quad\quad SH\quad SH$ $HSCH_2\text{-}\langle\text{ring}\rangle\text{-}CH_2SH$ $HSC_2H_4OC_2H_4SH$ $(HSC_2H_4OC_2H_4S)_2$ $HS.(CH_2)_n.SS.(CH_2)_n.SH$ where $n$ may vary from 2 to 20 or more.

$HS.CH_2.CH.CH_2.SS.CH_2.CH.CH_2.SH$
$\quad\quad\quad |\quad\quad\quad\quad\quad\quad\quad |$
$\quad\quad\quad CH_3\quad\quad\quad\quad\quad\quad CH_3$ $CH_3.CH.CH_2.CH_2.SS.CH_2.CH_2.CH.CH_3$
$\quad |\quad\quad\quad\quad\quad\quad\quad\quad\quad\quad\quad |$
$\quad SH\quad\quad\quad\quad\quad\quad\quad\quad\quad\quad SH$ $HS.CH_2.CH_2.O.CH_2.O.CH_2.CH_2.SS.CH_2.CH_2.SH$ $HS.CH_2.CH=CH.CH_2.SS.CH_2.CH=CH.CH_2SH$ $HS.CH_2.CH_2.S.CH_2.CH_2.SH$ $HS.CH_2.CH_2.SO_2.CH_2.CH_2.SH$ $HS.CH_2.CH=CH.CH_2.SH$ It is evident that the foregoing compounds are composed of either carbon, hydrogen and sulfur, or carbon, hydrogen, sulfur and oxygen.

For copolymerization purposes the invention employs the polyhydric alcohols in general, various specific examples thereof being given in the following list:

TABLE II

Glycols in general exemplified by the following:

$CH_2OH.CH_2OH$, ethelene glycol $CH_3.CHOH.CH_2OH$, propylene glycol $HO.CH_2.CH_2.CH_2OH$, trimethylene glycol $CH_3.CHOH.CHOH.CH_3$, butandiol 2,3

$CH_3.CHOH.CH_2.CH_2OH$, butandiol 1,3

$HO.CH_2.CH_2.CH_2.CH_2OH$, butandiol 1,4

$(CH_3)_2.C(OH)CH_2OH$, isobutylene glycol $(CH_3)_2C(OH)C(OH).(CH_3)_2$ pinacol $OH(CH_2)_nSS(CH_2)_nOH$ where $n$ may vary from 2 to 20 or more.

$OH.CH_2.CH.CH_2.SS.CH_2.CH.CH_2.OH$
$\quad\quad\quad\quad |\quad\quad\quad\quad\quad\quad\quad |$
$\quad\quad\quad\quad CH_3\quad\quad\quad\quad\quad\quad CH_3$ $OH.CH_2\text{-}\langle\text{ring}\rangle\text{-}CH_2.SS.CH_2\text{-}\langle\text{ring}\rangle\text{-}C_2H_2OH$

TABLE III

Polyhydric alcohols containing three or more OH groups, in general exemplified by the following:

$CH_2OH.CHOH.CH_2OH$, glycerine $CH_2.CHOH.CHOH.CH_2OH$, butantriol 1,2,3

The erythritols, having the empirical formula $CH_2OH.CHOH.CHOH.CH_2OH—C(CH_2OH)_4$, pentaerythritol The penta and hexahydric alcohols including:

| | |
|---|---|
| Arabitol | Sorbitol |
| Xylitol | Dulcitol |
| Mannitol | |

Polybasic acids in general may be used, e. g., maleic, fumaric, succinic, malic, adipic, citric, tartaric, phthalic, tricarballylic, etc., or the corresponding anhydrides. It is evident that the foregoing acids are composed of carbon, hydrogen and oxygen.

The principles of the invention will be defined in the claims and illustrated by the following specific examples.

Example 1

Reaction between dimercapto ethane and maleic acid. The reaction is carried out between 1 mol of dimercapto ethane and 1 mol of maleic acid. As a catalyst, $1/100$ of a mol of hydrochloric acid may be used. The reaction is carried out in an esterification flask fitted with a trap and reflux condenser so that the water formed as a result of the condensation may be removed. About 200 cc. of benzene may be added to aid in the elimination of water. The mixture is then heated to the boiling point of benzene until the theoretical volume of water has collected in the trap, the benzene is then distilled off on a water bath and the heating on the water bath may be continued from 5 to 6 hours. The resultant product when collected is a wax-like substance somewhat resembling paraffin wax in appearance. If the polymerization has been pushed to a high degree however the intermediate stages of the polymer condensation, reaction liquids of varying viscosity depending on the molecular weight are obtained.

In the above specific example any of the hereinabove listed bi-, tri- or other multifunctional mercapto compounds may be substituted. There is preferably used a minimum number of acid groups, e. g., carboxyl groups, equal to the number of SH groups.

Example 2

Proceed as in Example 1 substituting 2 mols of 1,2,3 trimercapto propane for the 1 mol of dimercapto ethane and 3 mols of maleic acid (or anhydride) for the 1 mol of maleic acid.

Mixtures containing polymercapto compounds having different specific structure or different degrees of functionality in respect of mercapto groups and mixtures of polymercapto compounds and polyhydric alcohols may be reacted with polybasic acids to produce interesting and valuable copolymers. Here again, the preferred minimum proportion of polybasic acid is that necessary to provide a total number of acid groups, e. g., carboxyl groups at least equal to the total number of mercapto or mercapto plus hydroxyl groups so that there may be enough total acid functional groups to balance the thioalcohol functions or thioalcohol plus alcohol functions. The reactants having a functionality of three or more produce cross-linkage whereas when all the reactants have a functionality limited to two, linear polymers are obtained. By varying the proportion of components producing linear growth to those producing cross-linkage, in the production of copolymers, the extent of cross-linkage may be controlled.

The production of copolymers will be illustrated in the following examples.

PREPARATION OF COPOLYMERS

Example 3

Reaction of a mixture of a polymercapto compound and of polyhydric alcohol with a polybasic acid, specifically the reaction of a mixture of trimercapto propane and glycerine with tricarballylic acid. Proceed as in Example 1 substituting a mixture of 1 mol of glycerine and 1 mol of trimercapto n-propane for the 1 mol of dimercapto ethane of Example 1 and 2 mols of tricarballylic acid for the 1 mol of maleic acid used in Example 1.

Example 4

Proceed as in Example 1 substituting a mixture of 2 mols of 1, 2, 3 trimercapto n-propane and 1 mol of pentaerythritol for the 1 mol of dimercapto ethane used in Example 1 and 5 mols of phthalic acid or phthalic anhydride for the 1 mol of maleic acid used in Example 1.

Example 5

Proceed as in Example 1 substituting a mixture of 2 mols of 1, 2, 3 trimercapto n-propane, 1 mol of dimercapto ethane and 1 mol of pentaerythritol for the 1 mol of dimercapto ethane used in Example 1 and 6 mols of fumaric acid for the 1 mol of maleic acid used in Example 1.

Example 6

Proceed as in Example 1 substituting a mixture of 2 mols of 1,5 dimercapto 3 mercaptomethyl pentane, 1 mol of dimercapto ethane and 1 mol of ethylene glycol for the 1 mol of dimercapto ethane of Example 1 and 5 mols of maleic acid or anhydride for the 1 mol of maleic acid used in Example 1.

Example 7

Proceed as in Example 1 substituting 1 mol of 1, 2, 3 trimercapto n-propane and 1 mol of dimercapto ethane for the 1 mol of dimercapto ethane of Example 1 and 2.5 mols of maleic acid for the 1 mol of maleic acid of Example 1.

Example 8

Proceed as in Example 7 using 10 mols of dimercapto ethane instead of 1 mol and increasing the maleic acid to 11.5 mols. In this polymer the extent of cross-linkage will be less than in the polymer of Example 7.

Example 9

Proceed as in Example 1 substituting a mixture of 1 mol of 1, 2, 3 trimercapto n-propane and 1 mol of pentaerythritol for the 1 mol of dimercaptoethane of Example 1 and 3.5 mols of adipic acid for the 1 mol of maleic acid of Example 1.

Example 10

Proceed as in Example 1 substituting a mixture of 1 mol of dimercaptoethane and 1 mol of BB' dihydroxydiethyl disulfide (see Table II) for the 1 mol of dimercapto ethane of Example 1 and 2 mols of adipic acid for the 1 mol of maleic acid of Example 1.

Example 11

Proceed as in Example 10 substituting for the glycol therein used, 1 mol of pentaerythritol and using 3 mols of phthalic acid instead of the 2 mols of adipic acid.

In the above examples, polymercapto compounds in general may be substituted for those specifically used in said examples and polyhydric alcohols in general may be substituted for those specifically used in said examples. Moreover, polybasic acids in general may be substituted for those specifically used in said examples.

By employing a mixture of a monobasic acid with polybasic acids, the character of the products may be modified. Various monobasic acids, particularly fatty acids both lower and higher may be used, as for example, acetic, propionic, butyric, valeric, palmitic, lauric, stearic, etc.

Such procedure may be exemplified by substituting in any of the above examples a portion of the polybasic acid by monobasic acid, the proportion of monobasic acid substituted may vary over a wide range, as for example, from 5 to 50 molar per cent of the monobasic acid in relation to the polybasic acid. A specific example of this procedure will be illustrated as follows:

Example 12

Proceed as in Example 5, substituting 5 mols of fumaric acid and 2 mols of lauric acid for the 6 mols of fumaric acid in Example 5.

In the reactions above set forth the catalyst may be omitted but is preferably used to increase the velocity of the reaction. The preferred catalysts are mineral or strong acids or acid salts, e. g., hydrochloric, sulfuric, phosphoric, chlorsulfonic, trichloracetic, etc., and acid salts or esters. Salts and compounds splitting off acid, e. g., by hydrolysis may also be used, e. g., AlCl₃, SO₂Cl₂, S₂Cl₂, etc.

The invention is not limited to the reaction of polybasic acids with monomeric polymercapto compounds since the reaction is one of general application to polymercapto compounds in the polymeric as well as in the monomeric condition. By employing the splitting or cleavage technique disclosed in our copending applications Ser. No. 502,298, filed September 14, 1943, and Ser. No. 512,594, filed December 2, 1943, both of which are now abandoned it is possible to prepare a wide variety of sulfide polymers in liquid form and the present invention may be applied advantageously to such polymeric products by the reaction of polybasic acids therewith. It has been found that a molecular weight of about 16,000 is an approximate upper limit consistent with fluidity.

Examples of the application of the invention to polymeric polymercapto compounds having varying degrees of molecular weight will be described. When the term "molecular weight" is applied to polymeric polymercapto compounds, it does not necessarily mean the molecular weight of a single chemical entity because in many cases the polymer will consist of a mixture of a large number of specifically different individual polymercapto compounds, as for example, when a polysulfide polymer is subjected to the said cleavage or splitting technique. However, the polymers thus obtained will have an average molecular weight.

There will first be described the production of polysulfide polymers having varying degrees of average molecular size followed by a description of the reaction thereof with polybasic acids.

*Example 13*

6 liters of 2-molar sodium disulfide solution are placed in a suitable flask equipped with means for mechanical agitation and a reflux condenser and to the polysulfide solution are added 50 grams of crystalline magnesium chloride and 20 grams of sodium hydroxide thereby leading to a gelatinous dispersion of magnesium hydroxide in the polysulfide solution. The agitator is kept running while the polysulfide is heated to a temperature of about 70° C. and 10 mols of BB′ dichloro diethyl formal are added slowly to the polysulfide mixture at a rate such that about one hour is required for the complete addition of the organic dihalide. The temperature during this addition should be controlled in such manner that it does not go above about 100° to 105° C. in order to prevent refluxing.

The stirred mixture is held at a temperature of about 105° C. for about an hour after all the organic dihalide is into the reaction after which the agitator is stopped and the latex like dispersion of the polymer is permitted to settle out from the liquid. After settling of the polymer is fairly complete the supernatant liquid is withdrawn by any suitable means as by siphoning and the dispersion is freed from soluble salts by repeated washing with warm water. This is most easily done by stirring the latex through the wash water and allowing it to settle, then withdrawing the water and replacing it with fresh.

To produce a satisfactorily high molecular weight it is desirable to treat the washed latex with about 2½ liters of a 2-molar solution of sodium disulfide similar to the one used in the preparation of the polymer. The suspension is then heated with this fresh charge of disulfide for about one hour at 100°–105° C., after which the polysulfide is washed out using the same technique as that described above for the initial washing of the latex. The latex like dispersion of the polymer resulting from the foregoing steps is, when coagulated, a tough, rubbery polymeric substance, the molecular weight of which is very high, certainly well over 50,000 and rough indications show it to have a molecular weight of approximately 100,000 to 120,000 and in some cases even higher.

It has been found that this high molecular weight polymer can be reduced to a dimercapto polymer having a molecular weight of approximately 16,000, which is about the upper limit consistent with fluidity, by proceeding in the following manner.

To the washed latex produced as above described is added 0.09 gram of sodium hydrosulfide and 5 grams of sodium sulfite. The volume of the fluid dispersion is heated with constant agitation to a temperature of about 90° C. for 30 minutes. The agitator is stopped and the dispersed polymer is permitted to settle out as described above and is then washed free from soluble salts in the manner already described.

When this split polymer is coagulated, as for example by making slightly acid with acetic acid, and the coagulum dried by any suitable means the product is found to be a very stiff viscous liquid which is capable of flowing under its own weight if given sufficient time to do so. It is found by chemical test to consist principally of a polymer having chain molecules terminated by mercaptan or thiol groups. Determinations of molecular weight both cryoscopically and by end group titration show its molecular weight to be an average of about 16,000 although as in the case of nearly all synthetic polymers, this figure is found to be an average or statistical one since it can be demonstrated that fractions can be separated having somewhat higher as well as fractions having somewhat lower molecular weights than the mean.

*Example 14*

Proceed exactly as in Example 13 to produce the high polymer but in the second part of the example involving the treatment with sodium hydrosulfide and sulfite the proportions of the splitting agents are varied in such a manner that 3.5 grams of sodium hydrosulfide and 15 grams of sodium sulfite are used. The volume is adjusted as described in Example 11 and the same heating technique is used. The coagulated and dried polymer from this example is found to be a slightly viscous liquid having a viscosity corresponding to that of a very thin syrup and viscosity measurements indicate that it has an absolute viscosity of 5 to 10 centipoises. Molecular weight determinations on this product indicate the molecule to be about 3 units long and the number molecular weight shows an average of about 500.

The above Examples 13 and 14 describe the production of polymers having an upper limit of average molecular weight of about 16,000 and a lower limit of average molecular weight of about 500. While the present invention, involving as it does the reaction of polybasic acids with polymercapto compounds generally, is not of course limited to the use in this reaction of polymers having an average molecular size indicated by the limits of 500 to 16,000 for the average molecular weights nevertheless this range as far as the polymers themselves are concerned, i. e., not necessarily dependent upon their reaction with polybasic acids, is a critical range for many purposes. If the molecular size is too large the fluidity of the material is decreased to a point where it is not practical to use it for purposes where fluidity is necessary, the character of the material then becoming more that of a rubber-like solid rather than a flowable liquid whereas if the molecular weight is too low the character of the material then becomes that of a somewhat volatile very thin liquid which is so readily absorbed by any kind of porous material with which it comes into contact that its application becomes difficult for the purposes of a sealant.

To obtain polymers having average molecular sizes intermediate between the lower limit of 500 and the upper limit of 16,000, the proportions of hydrosulfide and sulfite are varied as indicated in Examples 13 and 14.

Having shown details of the production of certain preferred polymeric polymercapto compounds in Examples 13 and 14, there will now be described specific illustrative instances of the reaction thereof with polybasic acids.

Example 15

Proceed as in Example 1 substituting for the 1 mol of dimercapto ethane in that example 500 grams of the fluid polymer obtained according to Example 14. The product is a rubber-like polymer, and thus sharply distinguished in properties from the wax-like polymer obtained by the reaction between maleic acid and dimercapto ethane in Example 1.

Example 16

Proceed as in Example 1 using instead of dimercapto ethane the polymer obtained as in Example 14 having an average molecular weight of about 16,000 and reacting this with slightly more than an equimolecular weight of maleic acid or anhydride. The product obtained is a rubber-like polymer, and the action of the acid on the polymer having the molecular weight of about 16,000 is a species of curing effect.

What is claimed is:

Process which comprises heating dimercapto ethane and maleic acid in equimolecular proportions in the presence of a mineral acid catalyst, splitting off water between the reactants and obtaining a polyester product.

JOSEPH C. PATRICK.
HARRY R. FERGUSON.

REFERENCES CITED

The following references are of record in the file of this patent:

UNITED STATES PATENTS

| Number | Name | Date |
|---|---|---|
| 1,984,417 | Mark et al. | Dec. 8, 1934 |
| 2,149,857 | Mikeska et al. | Mar. 7, 1939 |
| 2,195,380 | Patrick | Mar. 26, 1940 |
| 2,343,808 | Schlack | Mar. 7, 1944 |